US009112547B2

(12) United States Patent
Scheinert et al.

(10) Patent No.: US 9,112,547 B2
(45) Date of Patent: Aug. 18, 2015

(54) SYSTEM FOR AND METHOD OF CONFIGURING DISTRIBUTED ANTENNA COMMUNICATIONS SYSTEM

(75) Inventors: Stefan Scheinert, San Jose, CA (US); Peter Walther, Milpitas, CA (US)

(73) Assignee: ADC Telecommunications, Inc., Berwyn, PA (US)

( * ) Notice: Subject to any disclaimer, the term of this patent is extended or adjusted under 35 U.S.C. 154(b) by 2474 days.

(21) Appl. No.: 11/897,728

(22) Filed: Aug. 31, 2007

(65) Prior Publication Data
US 2009/0061940 A1 Mar. 5, 2009

(51) Int. Cl.
| | |
|---|---|
| H04B 1/00 | (2006.01) |
| H04B 15/00 | (2006.01) |
| H04M 1/00 | (2006.01) |
| H04B 7/02 | (2006.01) |
| H04W 88/08 | (2009.01) |

(52) U.S. Cl.
CPC ............. *H04B 7/022* (2013.01); *H04W 88/085* (2013.01)

(58) Field of Classification Search
CPC ...................... H04B 2001/1045; H04B 1/1027; H04B 1/71055
USPC ........... 455/424, 434, 447, 448, 452.1, 452.2, 455/62, 63.3, 562.1, 561, 103, 63.1
See application file for complete search history.

(56) References Cited

U.S. PATENT DOCUMENTS

| | | | |
|---|---|---|---|
| 3,866,121 A | 2/1975 | Nakamura et al. | |
| 4,061,981 A | * 12/1977 | Endres et al. ............. | 455/192.2 |
| 4,451,916 A | 5/1984 | Casper et al. | |
| 4,611,323 A | 9/1986 | Hessenmuller | |
| 4,628,501 A | 12/1986 | Loscoe | |

(Continued)

FOREIGN PATENT DOCUMENTS

| | | |
|---|---|---|
| DE | 3707244 A | 9/1988 |
| EP | 0391597 | 10/1990 |

(Continued)

OTHER PUBLICATIONS

Wala, "A New Microcell Architecture Using Digital Optical Transport ", "Proceedings of the Vehicular Technology Conference", May 18, 1993, pp. 585-588, Publisher: IEEE, Published in: US.
Akos et al., "Direct Bandpass Sampling of Multiple Distinct RF Signals", Jul. 1, 1999, pp. 983-988, vol. 47, Publisher: IEEE Transactions on Communications.
Foxcom Wireless Properietary Information, "Litenna In-Building RF Distribution System", 1998, pp. 1-8.

(Continued)

*Primary Examiner* — Nguyen Vo
(74) *Attorney, Agent, or Firm* — Fogg & Powers LLC

(57) ABSTRACT

A distributed antenna system comprises a plurality of antennas and a multi-port hub. The multi-port hub comprises an interface to a telecommunications network and a plurality of transceivers. The multi-port hub is configured to operate in a first mode ("normal" mode) in which the multi-port hub receives a downlink communications signal via the interface and distributes the downlink communications signal to the plurality of antennas using a selected downlink transmission frequency within a downlink frequency range and in which the multi-port hub receives uplink communications signals from the plurality of antennas at a selected uplink receive frequency. The multi-port hub is also configured to operate in a second mode ("listening" mode) in which the multi-port hub receives communications signals from the plurality of antennas at one or more frequencies within the downlink frequency range. The transmission frequency for the first mode ("normal" mode) may be selected based on field strength of the signals received in the second mode ("listening" mode).

28 Claims, 6 Drawing Sheets

(56) References Cited

U.S. PATENT DOCUMENTS

| | | |
|---|---|---|
| 4,654,843 A | 3/1987 | Roza et al. |
| 4,667,319 A | 5/1987 | Chum |
| 4,691,292 A | 9/1987 | Rothweiler |
| 4,760,573 A | 7/1988 | Calvignac et al. |
| 4,789,993 A | 12/1988 | Ryu |
| 4,813,054 A | 3/1989 | Plumb |
| 4,862,514 A | 8/1989 | Kedjierski |
| 4,999,831 A | 3/1991 | Grace |
| 5,193,109 A | 3/1993 | Chien-Yeh Lee |
| 5,200,955 A | 4/1993 | McFarlane et al. |
| 5,212,831 A | 5/1993 | Chuang et al. |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,351,146 A | 9/1994 | Chan et al. |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,563,606 A | 10/1996 | Wang |
| 5,566,168 A | 10/1996 | Dent |
| 5,603,080 A | 2/1997 | Kallander et al. |
| 5,621,786 A | 4/1997 | Fischer et al. |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,701,583 A | 12/1997 | Harbin et al. |
| 5,708,961 A | 1/1998 | Hylton et al. |
| 5,732,076 A | 3/1998 | Ketseoglou et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | Van der Kaay et al. |
| 5,781,541 A | 7/1998 | Schneider |
| 5,781,859 A | 7/1998 | Beasley |
| 5,787,344 A | 7/1998 | Scheinert |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,809,419 A | 9/1998 | Schellinger et al. |
| 5,809,422 A | 9/1998 | Raleigh et al. |
| 5,815,538 A | 9/1998 | Grell et al. |
| 5,822,324 A | 10/1998 | Kostresti et al. |
| 5,833,493 A | 11/1998 | Hung |
| 5,852,651 A | 12/1998 | Fischer et al. |
| 5,875,179 A | 2/1999 | Tikalsky |
| 5,878,325 A | 3/1999 | Dail |
| 5,883,882 A | 3/1999 | Schwartz |
| 5,884,145 A | 3/1999 | Haartsen |
| 5,887,261 A | 3/1999 | Csapo et al. |
| 5,907,544 A | 5/1999 | Rypinski |
| 5,912,641 A | 6/1999 | Dietrich |
| 5,930,682 A | 7/1999 | Schwartz et al. |
| 5,946,622 A | 8/1999 | Bojeryd |
| 5,969,837 A | 10/1999 | Farber et al. |
| 5,983,070 A | 11/1999 | Georges et al. |
| 5,987,014 A | 11/1999 | Magill et al. |
| 6,005,884 A | 12/1999 | Cook et al. |
| 6,014,546 A | 1/2000 | Georges et al. |
| 6,034,950 A | 3/2000 | Sauer et al. |
| 6,078,812 A | 6/2000 | Mintz |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,125,260 A | 9/2000 | Wiedeman et al. |
| 6,128,496 A | 10/2000 | Scheinert |
| 6,147,786 A | 11/2000 | Pan |
| 6,157,659 A | 12/2000 | Bird |
| 6,157,810 A | 12/2000 | Georges et al. |
| 6,181,687 B1 | 1/2001 | Bisdikian |
| 6,188,693 B1 | 2/2001 | Murakami |
| 6,188,719 B1 | 2/2001 | Collomby |
| 6,192,216 B1 | 2/2001 | Sabat, Jr. et al. |
| 6,195,342 B1 | 2/2001 | Rohani |
| 6,198,558 B1 | 3/2001 | Graves et al. |
| 6,222,660 B1 | 4/2001 | Traa |
| 6,226,274 B1 | 5/2001 | Reese et al. |
| 6,236,365 B1 | 5/2001 | LeBlanc et al. |
| 6,249,252 B1 | 6/2001 | Dupray |
| 6,262,981 B1 | 7/2001 | Schmutz |
| 6,275,990 B1 | 8/2001 | Dapper et al. |
| 6,285,881 B1 | 9/2001 | Huang |
| 6,317,884 B1 | 11/2001 | Eames et al. |
| 6,330,450 B1 * | 12/2001 | Wallstedt et al. ............. 455/447 |
| 6,337,754 B1 | 1/2002 | Imajo |
| 6,353,600 B1 | 3/2002 | Schwartz et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,421,009 B2 | 7/2002 | Suprunov |
| RE37,820 E | 8/2002 | Scheinert |
| 6,459,900 B1 | 10/2002 | Scheinert |
| 6,466,572 B1 | 10/2002 | Ethridge et al. |
| 6,466,766 B1 | 10/2002 | Treatch |
| 6,480,551 B1 | 11/2002 | Ohishi et al. |
| 6,484,012 B1 | 11/2002 | Nche et al. |
| 6,486,907 B1 | 11/2002 | Farber et al. |
| 6,498,936 B1 | 12/2002 | Raith |
| 6,556,551 B1 | 4/2003 | Schwartz |
| 6,567,473 B1 | 5/2003 | Tzannes |
| 6,574,472 B1 | 6/2003 | Scheinert |
| 6,594,496 B2 | 7/2003 | Schwartz |
| 6,667,973 B1 | 12/2003 | Gorshe et al. |
| 6,674,966 B1 | 1/2004 | Koonen |
| 6,684,058 B1 | 1/2004 | Karacaoglu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,768,745 B1 | 7/2004 | Gorshe et al. |
| 6,771,933 B1 | 8/2004 | Eng et al. |
| 6,785,558 B1 | 8/2004 | Stratford et al. |
| 6,801,767 B1 | 10/2004 | Schwartz et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,952,181 B2 | 10/2005 | Karr et al. |
| 6,963,305 B2 | 11/2005 | Knapp |
| 6,967,966 B1 | 11/2005 | Donohue |
| 7,014,500 B2 | 3/2006 | Belesimo |
| 7,016,308 B1 | 3/2006 | Gallagher |
| 7,035,671 B2 | 4/2006 | Solum |
| 7,050,786 B2 | 5/2006 | Caci |
| 7,103,279 B1 | 9/2006 | Koh et al. |
| 7,127,175 B2 | 10/2006 | Mani et al. |
| 7,136,624 B2 | 11/2006 | Ofuji et al. |
| 7,151,940 B2 | 12/2006 | Diao et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 7,313,415 B2 | 12/2007 | Wake et al. |
| 2002/0037054 A1 | 3/2002 | Schurig |
| 2002/0049061 A1 | 4/2002 | Pinola |
| 2002/0072329 A1 | 6/2002 | Bandeira et al. |
| 2002/0089958 A1 | 7/2002 | Feder et al. |
| 2002/0103012 A1 | 8/2002 | Kim et al. |
| 2002/0128009 A1 | 9/2002 | Boch et al. |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0040335 A1 | 2/2003 | McIntosh et al. |
| 2003/0043928 A1 | 3/2003 | Ling et al. |
| 2003/0143947 A1 | 7/2003 | Lyu |

(56) References Cited

U.S. PATENT DOCUMENTS

| | | |
|---|---|---|
| 2003/0162498 A1 | 8/2003 | Rofheart et al. |
| 2003/0216121 A1 | 11/2003 | Yarkosky |
| 2004/0001477 A1 | 1/2004 | D'Amico et al. |
| 2004/0003804 A1 | 1/2004 | Yasui |
| 2004/0010609 A1 | 1/2004 | Vilander et al. |
| 2004/0037565 A1 | 2/2004 | Young et al. |
| 2004/0066326 A1 | 4/2004 | Knapp |
| 2004/0102195 A1 | 5/2004 | Naghian et al. |
| 2004/0152482 A1 | 8/2004 | Raffel et al. |
| 2004/0198453 A1 | 10/2004 | Cutrer et al. |
| 2004/0204097 A1 | 10/2004 | Scheinert et al. |
| 2004/0219950 A1 | 11/2004 | Pallonen et al. |
| 2004/0233877 A1 | 11/2004 | Lee et al. |
| 2004/0248580 A1 | 12/2004 | Backes et al. |
| 2004/0258100 A1 | 12/2004 | Jantti et al. |
| 2005/0007993 A1 | 1/2005 | Chambers et al. |
| 2005/0143091 A1 | 6/2005 | Shapira et al. |
| 2005/0147067 A1 | 7/2005 | Mani et al. |
| 2005/0148368 A1 | 7/2005 | Scheinert et al. |
| 2005/0153712 A1 | 7/2005 | Osaka et al. |
| 2005/0157675 A1 | 7/2005 | Feder et al. |
| 2005/0176368 A1 | 8/2005 | Young et al. |
| 2005/0201323 A1 | 9/2005 | Mani et al. |
| 2005/0221817 A1 | 10/2005 | Pinola |
| 2005/0227710 A1 | 10/2005 | Yamashita et al. |
| 2005/0233710 A1 | 10/2005 | Lakkis et al. |
| 2005/0243785 A1 | 11/2005 | Sabat, Jr. et al. |
| 2005/0250503 A1 | 11/2005 | Cutrer |
| 2006/0025158 A1 | 2/2006 | Leblanc |
| 2006/0041680 A1 | 2/2006 | Proctor, Jr. et al. |
| 2006/0072602 A1 | 4/2006 | Achanta |
| 2006/0094470 A1 | 5/2006 | Wake et al. |
| 2006/0121944 A1 | 6/2006 | Buscaglia et al. |
| 2006/0123053 A1 | 6/2006 | Scannell, Jr. |
| 2006/0133346 A1 | 6/2006 | Chheda et al. |
| 2006/0172710 A1 | 8/2006 | Cahana et al. |
| 2006/0193295 A1 | 8/2006 | White et al. |
| 2006/0234722 A1 | 10/2006 | Hanebeck et al. |
| 2007/0099562 A1 | 5/2007 | Karabinis et al. |
| 2008/0014948 A1 | 1/2008 | Scheinert |
| 2009/0061766 A1 | 3/2009 | Ding et al. |

FOREIGN PATENT DOCUMENTS

| | | |
|---|---|---|
| EP | 0664621 | 7/1995 |
| EP | 0876073 | 11/1998 |
| EP | 1248477 | 10/2002 |
| GB | 2253770 | 9/1992 |
| GB | 2289198 | 11/1995 |
| GB | 2315959 | 2/1998 |
| GB | 2320653 | 6/1998 |
| JP | 2002506582 | 2/2002 |
| JP | 2007053768 | 3/2007 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 9944308 | 9/1999 |
| WO | 0174013 | 10/2001 |
| WO | 0174100 | 10/2001 |
| WO | 2004034508 | 4/2004 |
| WO | 2007084046 | 7/2007 |

OTHER PUBLICATIONS

1998 Foxcom Wireless Proprietary Information, "Application Note "RFiber—RF Fiberoptic Links for Wireless Applications"", 1998, pp. 3-11, Published in: US.

Nakatsugawa et al., "Software Radio Base and Personal Stations for Cellular/PCS Systems", 2000, pp. 617-621, Publisher: IEEE.

"Tektronix Synchronous Optical Network (SONET)", "http://www.iec.org/online/tutorials/sonet/topic03.html", 2002, Publisher: International Engineering Consortium.

Georges et al., "U.S. Appl. No. 08/635,368", "Distribution of Radio-Frequency Signals Through Low Bandwidth Infrastructures", Filed Apr. 19, 1996, Publisher: Abandoned, Published in: US.

Schwartz, "U.S. Appl. No. 09/560,656", "Adaptive Capacity Management in a Centralized Basestation Architecture", Filed on Apr. 27, 2000, Publisher: Abandoned, Published in: US.

Wong et al., "U.S. Appl. No. 09/561,372", "A Cellular Communications System With Centralized Capacity Resources Using DWDM Fiber Optic Backbone", Filed on Apr. 28, 2000, Publisher: Abandoned, Published in: US.

"Edge Introduction of High-Speed Data in GSM/GPSR Networks", 2003, pp. 1-16, Publisher: Ericsson AB.

"Mulitple-Input Multiple-Output Communications", "http://en.wikipedia_org/wiki/Multiple-input_multiple_ouput_communications", May 17, 2007, Publisher: Wikipedia, Published in: US.

Hewlett-Packard Development Co., L.P., "Voice Over Wireless Lan Solution Brief", "ProCurve Networking by H.P.", 2006, Publisher: Hewlett-Packard Development Co., L.P.

International Searching Authority, "International Search Report", Apr. 24, 2008, Published in: WO.

"Products: nanoGSM® picocell," ip.access, pp. 1-8, downloaded from http://www.ipaccess.com/nanoGSM/nanoGSM.htm on Aug. 2, 2007.

B. Schweber, Maintaining cellular connectivity indoors demands sophisticated design, EDN Magazine, Dec. 21, 2000.

Chinese Patent Office, "Notification to Grant Patent Right for Invention for Application No. 200780039284.3", "from Foreign Counterpart to U.S. Appl. No. 11/511,646", Oct. 24, 2013, pp. 1-5, Published in: CN.

State Intellectual Property Office, P.R. China, "First Office Action", "from Foreign Counterpart of U.S. Appl. No. 11/511,646", Apr. 1, 2012, pp. 1-13, Published in: CN.

State Intellectual Property Office, P.R. China, "Second Office Action", "from Foreign Counterpart of U.S. Appl. No. 11/511,646", Nov. 2, 2012, pp. 1-18, Published in: CN.

State Intellectual Property Office, P.R. China, "Third Office Action", "from Foreign Counterpart of U.S. Appl. No. 11/511,646", Mar. 26, 2013, pp. 1-29, Published in: CN.

European Patent Office, "European Search Report", "from Foreign Counterpart of U.S. Appl. No. 11/511,646", Oct. 10, 2012, pp. 1-8, Published in: EP.

Japanese Patent Office, "Notice of Grant", "from Foreign Counterpart of U.S. Appl. No. 11/511,646", Jul. 10, 2012, pp. 1-4, Published in: JP.

Japanese Patent Office, "First Office Action", "from Foreign Counterpart of U.S. Appl. No. 11/511,646", Nov. 29, 2011, pp. 1-5, Published in: JP.

Canadian Patent Office, "Canadian Office Action for Application U.S. Appl. No. 2,697,787", "from Foreign Counterpart U.S. Appl. No. 11/897,728", Apr. 24, 2014, pp. 1-2, Published in: CA.

State Intellectual Property Office, P.R. China, "First Office Action", "from Foreign Counterpart of U.S. Appl. No. 11/897,728", Jun. 12, 2012, pp. 1-22, Published in: CN.

Choi et al, "Automatic On-Off Switching Repeater for DS/CDMA Reverse Link Capacity Improvement", "IEEE Communication Letters", Apr. 2001, pp. 138-141, vol. 5, No. 4, Publisher: IEEE.

Yanikomeroglu et al., "Sir-Balanced Macro Power Control for the Reverse Link of Cdma Sectorized Distributed Antenna System", "The Ninth IEEE International Symposium on Personal, Indoor and Mobile Radio Communications", 1998, pp. 915-920, vol. 2, Publisher: IEEE.

European Patent Office, "Extended European Search Report", "from Foreign Counterpart of U.S. Appl. No. 11/897,728", Dec. 5, 2012, pp. 1-7, Published in: EP.

Chinese Patent Office, "Notification of Grant Patent Right for Invention", "from Foreign Counterpart of U.S. Appl. No. 11/897,728", Feb. 21, 2013, pp. 1-6, Published in: CN.

Canadian Patent Office, "Office Action for Canadian Application Serial No. 2,697,787", "from Foreign Counterpart to U.S. Appl. No. 11/87,728", Mar. 30, 2015, pp. 1-4, Published in: CA.

* cited by examiner

SYSTEM FOR AND METHOD OF CONFIGURING DISTRIBUTED ANTENNA COMMUNICATIONS SYSTEM

FIELD OF THE INVENTION

The present invention relates to the field of wireless communications and, more particularly, to distributed antenna systems for wireless communications.

BACKGROUND OF THE INVENTION

A conventional wireless cellular telecommunication network is comprised of multiple overlapping coverage areas or "cells." Mobile units (e.g. cellular telephones) travel from cell to cell while communicating via the network. Handovers between cells occur when the mobile units travel from one cell to another.

Each cell is formed by a base transceiver station (BTS or "base station"). A typical base station comprises multiple transceivers and antennas for sending radio signals to the mobile units within the cell (downlink) and for receiving radio signals from the mobile units within the cell (uplink). Base stations are strategically located so as to maximize communications coverage over large geographical areas. The base stations are communicatively coupled to the cellular telecommunication network via backhaul connections.

The cellular telecommunication network may also include base station controllers (BSCs) and mobile switching centers (MSCs). Several base stations may be under the control of a single BSC. The BSC generally functions as a signal concentrator, allocates radio channels to mobile units and controls handovers from base station to base station. The BSC is, in turn, coupled to an MSC. The MSC generally functions as a telephone exchange to provide circuit switching functionality. The MSC is coupled to a public switched telecommunication network (PSTN) for voice communications and may also be coupled the Internet for data communications.

To prevent interference between the uplink and downlink signaling within each cell, different communication frequencies are used for the uplink and the downlink within each cell. In addition, to prevent interference among adjacent cells, the communication frequencies used within each cell differ from those of adjacent cells.

Due to the need to avoid interference with adjacent cells and other factors, installation and set-up of such cellular networks as well as the integration of new equipment to an existing cellular network can be complex and time consuming.

Further, such cellular telecommunication networks can experience difficulties due to indoor penetration loss. For example, if a mobile unit is located indoors, an additional indoor penetration loss of 8 dB to 30 dB is common. A distributed antenna system (DAS) can be used to provide indoor coverage for wireless communications. In such a DAS, transmitted power is divided among several antennas in distributed locations so as to provide a large coverage area using less transmitted power than would be required by a single antenna system.

As with other equipment, the integration of a distributed antenna system to an existing cellular network can be complex and time consuming. Therefore, there is a need for an improved system for and method of configuring a distributed antenna system.

SUMMARY OF THE INVENTION

The present invention provides a system for and method of configuring a distributed antenna system. In accordance with an embodiment of the invention, a distributed antenna system comprises a plurality of antennas and a multi-port hub. The multi-port hub comprises an interface to a telecommunications network and a plurality of transceivers. The multi-port hub is configured to operate in a first mode ("normal" mode) in which the multi-port hub receives a downlink communications signal via the interface and distributes the downlink communications signal to the plurality of antennas using a selected downlink transmission frequency within a downlink frequency range and in which the multi-port hub receives uplink communications signals from the plurality of antennas at a selected uplink receive frequency. The multi-port hub is also configured to operate in a first mode ("normal" mode) in which the multi-port hub receives communications signals from the plurality of antennas and the meter measures the field strength of each of the signals at a plurality of frequencies. The transmission frequency for the first mode ("normal" mode) may be selected based on measured field strength of the signals received in the second mode ("listening" mode).

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
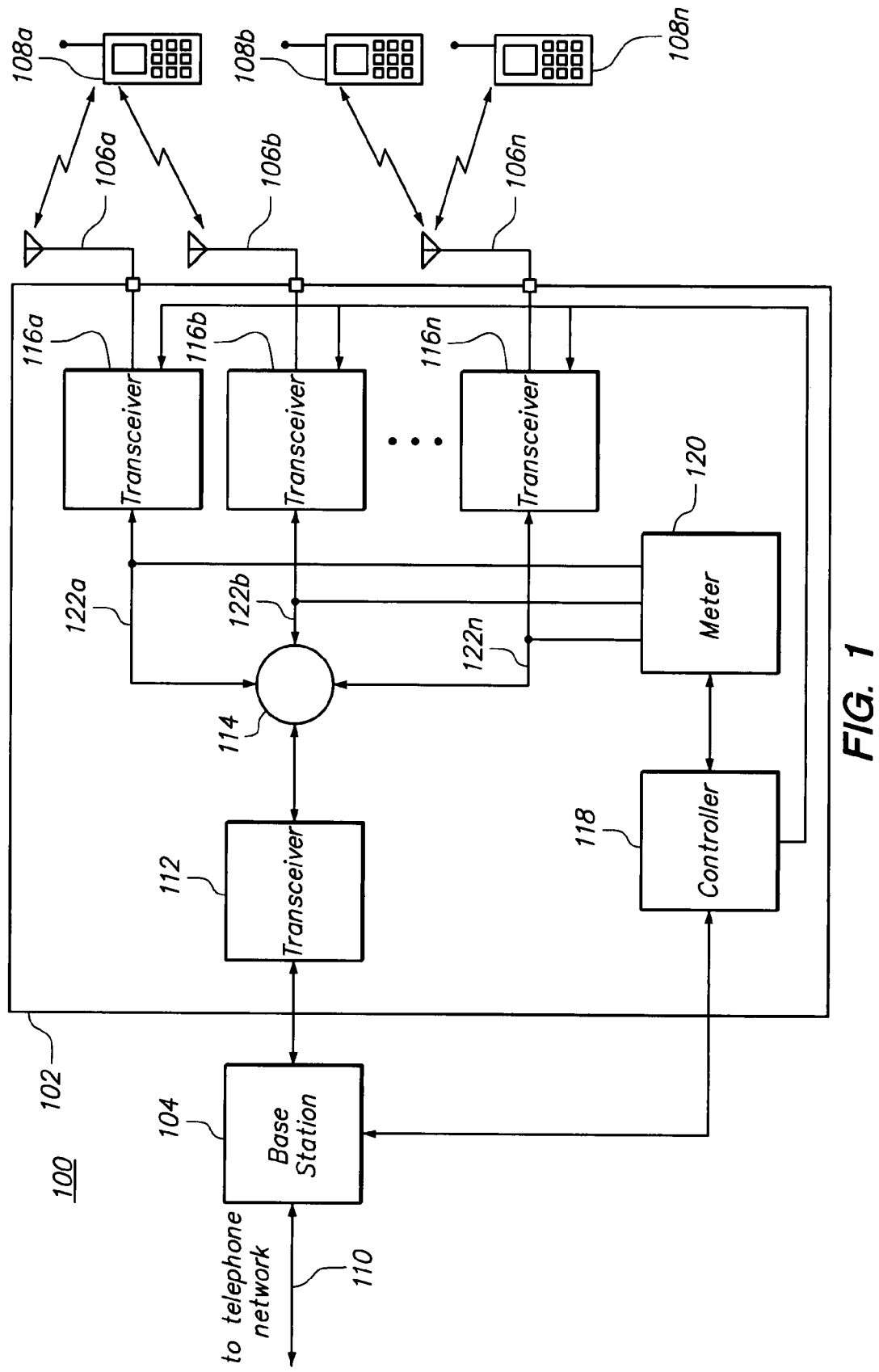
FIG. 1 illustrates a distributed antenna communications system configured for communication with mobile units in accordance with an embodiment of the present invention.

FIG. 1 illustrates a distributed antenna communications system 100 in accordance with an embodiment of the present invention. The system 100 includes a communications hub 102, and a plurality of distributed antennas 106a-n coupled to ports of the hub 102. A base transceiver station 104 is communicatively coupled to the hub 102. In addition, one or more mobile communications devices 108a-n are communicatively coupled to the hub 102 via the antennas 106a-n. The base station 104 may be located at the site of a cellular service provider and may be coupled to a cellular telecommunication network via a backhaul 110. The hub 102 may be located at the premises of a telecommunications subscriber with the antennas 106a-n being distributed throughout the premises. For example, the hub 102 may be located within a building (e.g., in a utility room) with the antennas distributed throughout the building so as to provide indoor coverage areas for mobile devices 108a-n. The mobile devices 108a-n may be, for example, cell phones. While three mobile devices 108a-n and three antennas 106a-n are illustrated, it will be apparent that more or fewer of either may be present. In an embodiment, up to eight antennas 106a-n may be coupled to a single hub 102. Additionally, one or more of the antennas 106a-n may be located outdoors.

Rather than locating the base station 104 at a remote location from the hub 102, as shown in FIG. 1, the base station 104 and hub 102 may be co-located. For example, functionality of the base station 104 may be integrated with that of the hub 102 into a single piece of equipment located at the subscriber premises.

The system 100 preferably provides for two-way communications. For the downlink, telecommunications signals are received by the base station 104 from the cellular telecommunication network and distributed to the antennas 106a-n. To accomplish this, a transceiver 112 may receive the downlink signal from the base station 104. The transceiver 112 then amplifies the downlink signal to an appropriate level for forwarding to a distribution node 114. The distribution node 114 then repeats and distributes the signal to a plurality of transceivers 116a-n such that each of the transceivers 116a-n receives a copy of the downlink signal. The transceivers 116a-n each transmit the signal received from the distribution node 114 via a corresponding one of the antennas 106a-n. The mobile devices 108a-n each pick up the downlink signal from one or more of the antennas 106a-n.

For the uplink, signals from the mobile devices 108a-n are received by the transceivers 116a-n via the antennas 106a-n. The signals are then forwarded to the distribution node 114 which combines the signals (e.g., by simple summation) into a combined signal. The combined signal is transmitted to the base station 104 by the transceiver 112. The base station 104 then forwards the combined signal to the cellular telecommunication network.

In an embodiment, the downlink signal from the base station 104 is RF (Radio Frequency). For example, this signal is communicated via a cable or via a wireless link between the transceiver 112 and the base station 104. In this case, the transceiver 112 may down-convert the downlink signal from RF to IF. This signal is then distributed to the transceivers 116a-n in IF. The transceivers 116a-n up-convert the IF signal to RF (Radio Frequency) before transmitting the signal to the mobile devices 108a-n. For the uplink, the transceivers 116a-n down-convert RF signals received from the mobile devices 108a-n to IF. These IF signals are then processed and combined for delivery to the transceiver 112 in IF. The transceiver 112 then up-converts the IF signal to RF for delivery the base station 104. Accordingly, the transceiver 112 functions as an interface to the telephone network via the base station 104.

So that multiple mobile devices 108a-n may communicate via the system 100 simultaneously, each communicates in a different channel. For example, CDMA (Code-Division, Multiple Access) protocols for cellular communication, such as UMTS (Universal Mobile Telecommunications System), or TDMA (Time-Division, Multiple-Access) protocols for cellular communication, such as GSM (Global System for Mobile Communications) may be employed by the system 100. Thus, for the downlink, the same signal including the various channels is transmitted via each of the antennas 106a-n so that it may be received by any of the mobile devices 108a-n without regard to which of the antennas 106a-n is closest to a particular one of the mobile devices. For the up-link, the signal from a particular mobile device may be picked up by one or more antennas 106a-n. As shown in FIG. 1, the signal from device 108a is picked up by antennas 106a and 106b, though the signal may be stronger at one of the antennas than the other. As is also shown in FIG. 1, the signal from device 108b is picked up only by antenna 106n. The signal from device 108n is also picked up only by the antenna 106n. All of the signals picked up by any of the antennas 106a-n are combined at node 114 and included in the combined signal received at the base station 104. The hub 102 may also include a controller 118 and a meter 120, whose functions are described in more detail herein.

Figure 2:
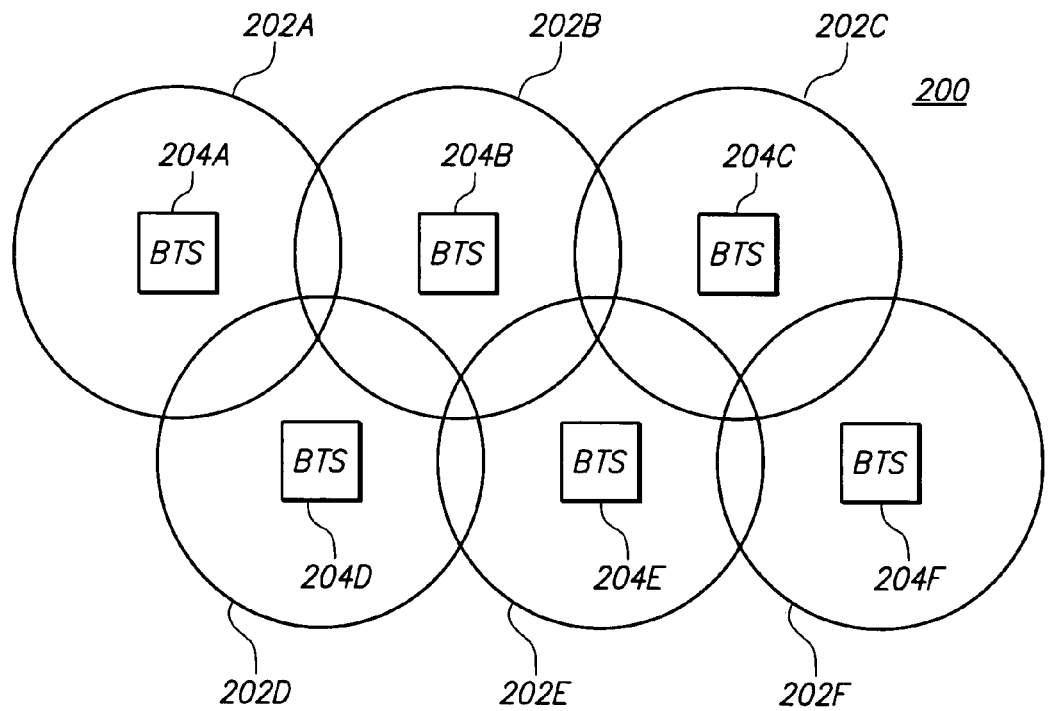
FIG. 2 illustrates cellular coverage areas of a cellular telecommunication network in which the distributed antenna system of FIG. 1 may be deployed in accordance with an embodiment of the present invention.

FIG. 2 illustrates cellular coverage areas 202A-F or "cells" of a cellular telecommunication network 200 in which the distributed antenna system 100 of FIG. 1 may be deployed. Each of the cells 202A-F is roughly centered about a corresponding one of base stations 204A-F. While six such cells are shown, it will be apparent that a cellular network could be comprised of a different number of cells. For example, a large cellular network may comprise tens or even hundreds of cells which provide coverage for a large geographical area. In this case, many of the cells may be completely surrounded by adjacent neighbor cells.

Figure 3:
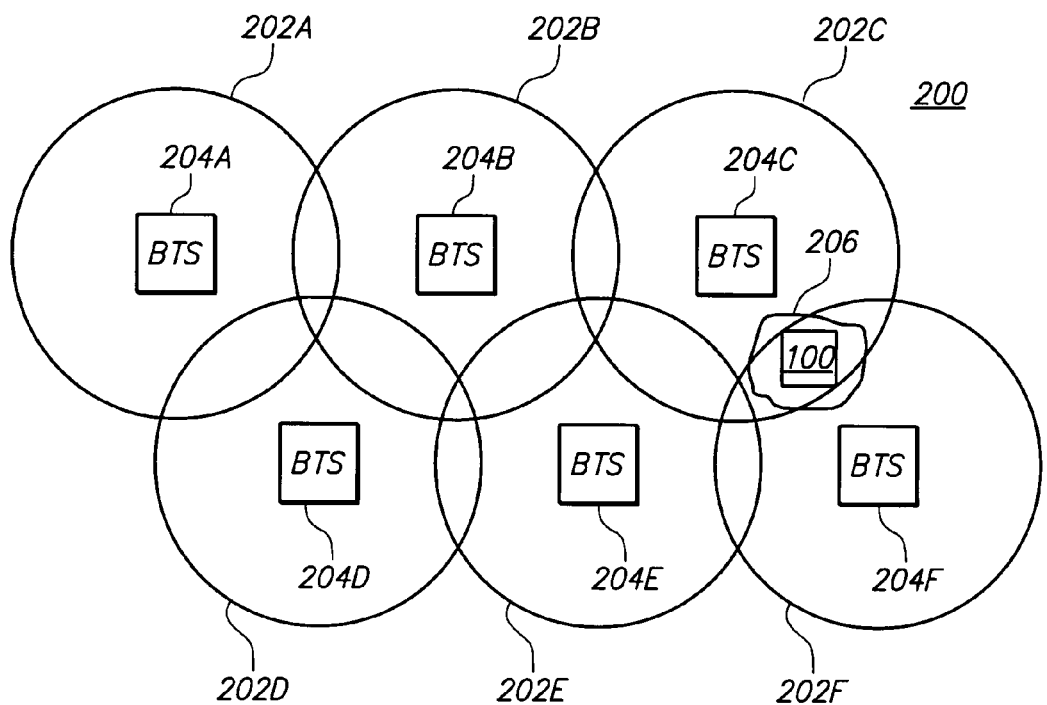
FIG. 3 illustrates a distributed antenna system being deployed in the cellular network of FIG. 2 in accordance with an embodiment of the present invention.

FIG. 3 illustrates the distributed antenna system 100 being deployed in the cellular network 200 of FIG. 2. As shown in FIG. 3, the distributed antenna system 100 forms a coverage area 206. The coverage area 206 is shown having an irregular shape because the antennas 106a-n (FIG. 1) may be positioned in various different locations. In addition, one or more of the antennas 106a-n may be located within a building, the structure of which will tend to attenuate signal strength.

Because the coverage area 206 of the distributed antenna system 100 may overlap one or more of the cells 202A-F of the cellular network 200, it is possible for interference to occur between the distributed antenna system 100 and one or more of the cells of the cellular network 200. To avoid this, the distributed antenna system 100 is preferably configured so as to avoid employing any of the communication frequencies that are used by those cells of the network 200 whose coverage areas overlap that of the distributed antenna system 100 unless the signal strength of the cells of the network 200 in the overlapping coverage area is sufficiently low that interference is unlikely.

Referring again to FIG. 1, normal operation of the distributed antenna system 100 is shown. In this mode of operation, which may be referred to as "normal" mode, the distributed antenna system 100 transmits signals via the transceivers 116a-n using transmission frequencies assigned to the downlink signaling direction. The distributed antenna system 100 also receives signals via the transceivers 116a-n in frequencies assigned to the uplink signaling direction. The normal mode is used for facilitating communications for the mobile units 108a-n. While the distributed antenna system 100 is operating in normal mode, the base stations 204A-F of the cellular network 200 (shown in FIGS. 2 and 3) also transmit signals using downlink frequencies. The base stations 204A-F also receive signals in frequencies assigned to the uplink signaling direction. Therefore, the base stations 204A-F and the distributed antenna system 100 may interfere with one another by attempting to transmit different information at the same frequency and in the same area. However, the base stations 204A-F and the distributed antenna system 100 would not "see" each other because they are each configured to only receive signals assigned to the uplink signaling direction.

Figure 4:
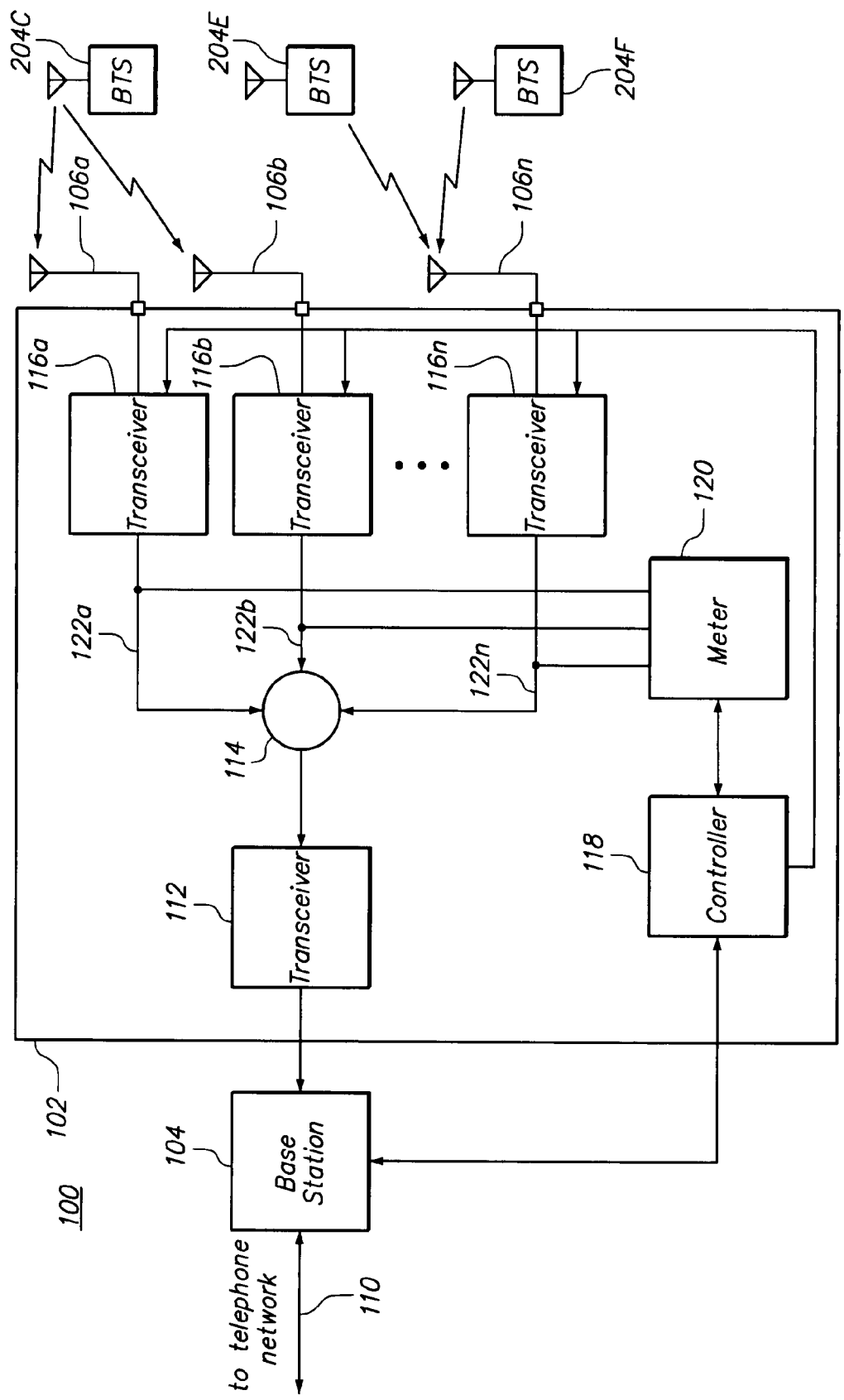
FIG. 4 illustrates a distributed antenna communications system being configured for deployment in a cellular network in accordance with an embodiment of the present invention.

FIG. 4 illustrates the distributed antenna communications system 100 being configured for deployment in the cellular network 200 in accordance with an embodiment of the present invention. As shown in FIG. 4, the transceivers 116a-n are configured to receive signals in frequency bands transmitted by the base stations 204A-F (downlink frequencies). Therefore, in this mode of operation, which may be referred to as "listening" or "mobile" mode, the transceivers 116a-n are configured to receive signals assigned to the downlink signaling direction. In this mode, however, the distributed antenna system 100 may be unable to facilitate communications with the mobile units 108a-n because the mobile units 108a-n only transmit in frequencies assigned to the uplink signaling direction.

In the listening mode, the distributed antenna system 100 detects signals from the base stations 204A-F of the cellular network 200 by listening for their downlink signals. This is used to identify downlink frequencies used by the base stations 204A-F which might interfere with transmissions by the distributed antenna system 100. Interference is then avoided by selecting transmission frequencies for use by the distributed antenna system 100 in normal mode that differ from those whose signal strength detected during listening mode is sufficiently strong that interference is likely to occur.

To enter listening mode, the controller 118 may instruct the transceivers 116a-n of the distributed antenna system 100 to tune their receive frequencies to correspond to the frequencies assigned to the downlink signaling direction. For example, the distributed antenna system 100 may be configured to operate in a specific frequency band containing several frequency channels. In this case, the transceivers 116a-n may be tuned to a first one of the channels within the band. In addition, the transceivers 116a-n may be instructed to cease transmitting.

The meter 120 is coupled to lines 122a-n from each of the transceivers 116a-n. During listening mode, the meter 120 monitors the received signals via lines 122a-n to determine their levels and, thus, field strengths received at antennas 106a-n. Because the transceivers 116a-n may initially be tuned to the first frequency channel within the band, the meter 120 may first determine the field strength for the first frequency channel. The meter 120 may simultaneously monitor all of the lines 122a-n or, alternatively, the meter 120 may cycle through the lines 122a-n, measuring the field strengths on the lines 122a-n one-at-a-time. The transceivers 116a-n may then be tuned to the next frequency channel in the band so that the field strength measurements may be taken for that frequency channel. This process may be continued until the field strength for each frequency channel within the band is measured for each of the transceivers 116a-n. Rather than measuring the field strength for a frequency channel for all of the transceivers 106a-n and then measuring the field strength for a next channel, the field strength for all of the channels may be measured for a single transceiver before measuring the field strength for all of the channels for the next transceiver. In other words, the order in which the field strength measurements are taken may vary.

Once the field strength values are determined for the signals received from the base stations 204A-F of the cellular network 200, this information may be used to configure the transceivers 116a-n to transmit using a frequency that differs from any of those identified as having a field strength that sufficiently strong that interference is likely. For example, the distributed antenna system 100 may be configured to transmit using a specified channel within a frequency band. In this way, interference between the distributed antenna system 100 and any overlapping cells of the cellular network 100 is avoided. The distributed antenna system 100 may then enter normal mode in which the selected transmission frequency is used. Selection of a transmission frequency for the downlink will typically also involve selecting a paired receive frequency for the uplink.

If the distributed antenna system 100 supports multiple frequency bands, such as 900 MHz and 1800 MHz, the distributed antenna system 100 may monitor each of the bands while in listening mode. This may be accomplished by tuning the transceivers 116a-n to one of the bands first, and then to another, until all the bands have been monitored. If the distributed antenna system 100 supports multiple bands, such 900 MHz or 1800 MHz, but is able to operate in only one band at a time, it may be unnecessary to detect frequencies in all of the bands. This is because the distributed antenna system 100 need only avoid interference in the bands in which it is actually operating. In this case, a human operator may configure the distributed antenna system 100 to select its operating band. Alternatively, the distributed antenna system 100 may automatically select the most-recent frequency band that used by the distributed antenna system 100 or that was used by the base station 104 for monitoring in listening mode.

Figure 5:
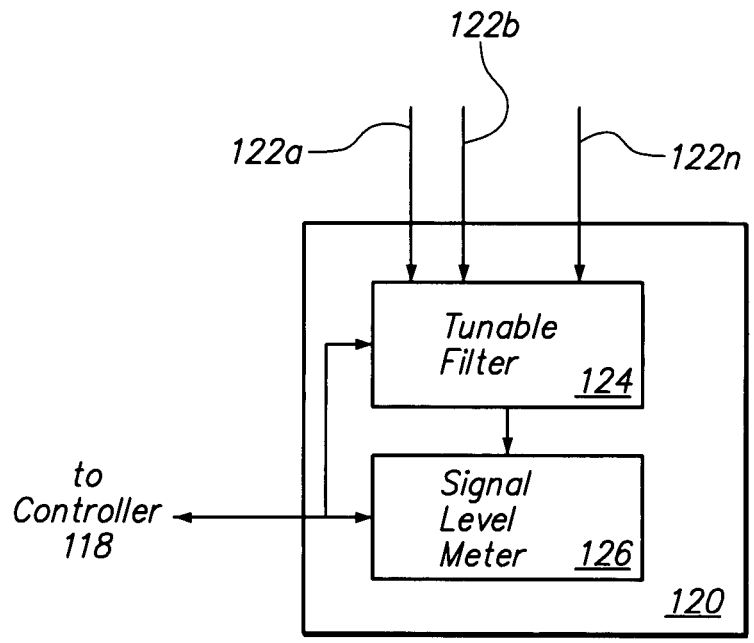
FIG. 5 illustrates a signal field strength meter in accordance with an embodiment of the present invention.

As described above, the transceivers 116a-n are tunable to the various channels within a frequency band (i.e. the transceivers are channelized). In an alternative embodiment, the transceivers 116a-n may be tuned to simultaneously receive several frequencies within a band (i.e. the transceivers are broadband). In this case, the meter 120 may be provided with a tunable filter in order to obtain field strength measurements for each channel. FIG. 5 illustrates the field strength meter 120 in accordance with an embodiment of the present invention. As shown in FIG. 5, the meter 120 includes a tunable filter 124 which is coupled to each of the lines 122a-n. The tunable filter 124 is controlled by the controller 118 to tune to each channel. A signal level meter 126 is coupled to the tunable filter 124 to obtain the field strength measurements and to report them to the controller 118.

Figure 6A:
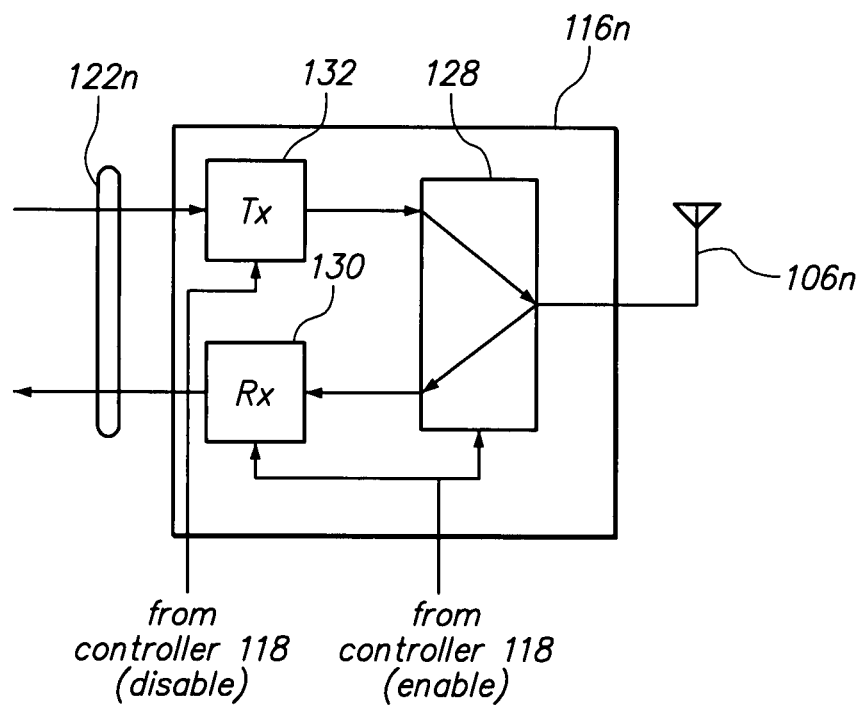
FIGS. 6A-B illustrate a transceiver for interfacing with mobile units in accordance with embodiments of the present invention.

For listening mode, the transceivers 116a-n are reconfigured to receive frequencies assigned to the downlink. In an embodiment, the transceivers 116a-n include an tunable receive signal path which can be tuned to the downlink frequencies. FIG. 6A illustrates a transceiver 116n having a tunable receive signal path in accordance with an embodiment of the present invention. As shown in FIG. 6A, the transceiver 116n includes a tunable duplexer 128 which is coupled to the antenna 106n. Signals received by the antenna 106n are allowed to pass through the duplexer 128 and a receiver 130 before being passed to other elements of the hub 102 via line 122n. The receiver 130 may perform filtering and frequency down-converting of the received signal. As shown in FIG. 6A, the receive signal path, including the duplexer 128 and receiver 130, are tunable under control of the controller 118 depending upon whether the system is in listening mode or normal mode. In addition, a transmitter 132 may be disabled by the controller 118 during listening mode. In normal mode, the transmitter 132 may perform such functions as signal filtering and frequency up-conversion.

Figure 6B:
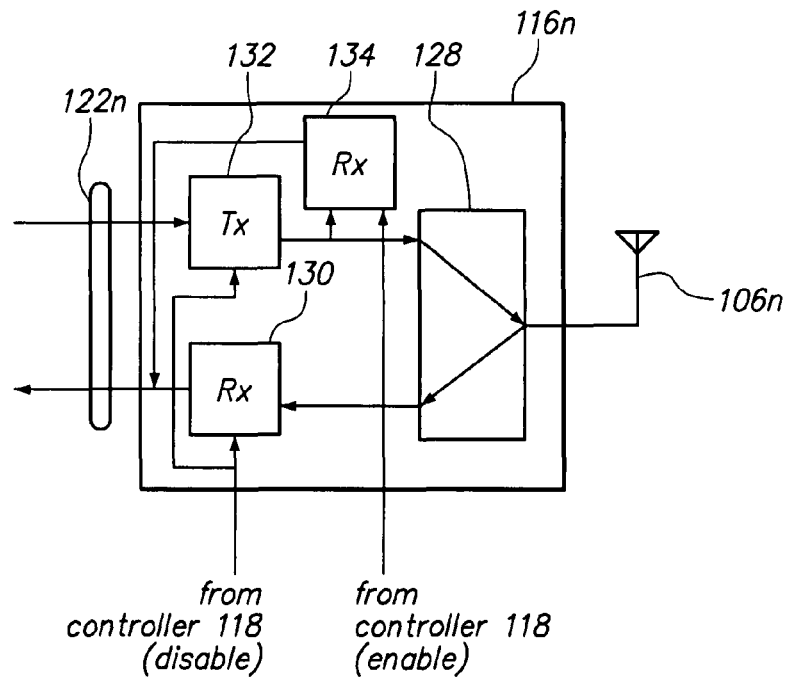

In an alternative embodiment, rather than the transceivers 116a-n including a tunable receive signal path as in FIG. 6A, the transceivers 116a-n may include an alternative signal path for listening mode. FIG. 6B illustrates a transceiver 116n having an alternative receive signal path in accordance with an embodiment of the present invention. As shown in FIG. 6B, the transceiver 116n includes a duplexer 128, a receiver 130 and a transmitter 132. During normal mode, the receiver 130 receives signals from the antenna 106n via the duplexer 128 and the transmitter 132 sends signals to the antenna 106n via the duplexer 128. The receiver 130 is configured to receive signals within the frequency range assigned to the uplink. In addition, the transceiver 116n includes an alternative signal path through a second receiver 134. The second receiver 134 is configured to receive signals within the frequency range assigned to the downlink.

The second receiver 134 may be coupled to the transmit side of the duplexer 128 for receiving signals from the duplexer 128 during listening mode. This is because the duplexer 128 is configured such that its transmit side will pass the range of frequencies assigned to the downlink. During listening mode, the received signals are also within the downlink frequencies. The output of the receiver 134 is coupled to the receive signal path at the output of the receiver 130. To reconfigure the transceiver 116n of FIG. 6B for listening mode, the controller 118 disables the receive signal path by disabling the receiver 130 and enables the alternative receive signal path by enabling the receiver 134. To return to normal mode, the receive signal path is enabled by enabling the receiver 130, while the alternative receive signal path is disabled by disabling the receiver 134.

Rather than the second receiver 134 being coupled to the transmit side of the duplexer 128 as shown in FIG. 6B, the second receiver 134 may be coupled to the antenna 106n. In this embodiment, the alternative receive signal path bypasses the duplexer 128. Also, in this embodiment, the second receiver 134 may include a filter between the antenna 106a and its receive circuitry.

When the distributed antenna system 100 is in listening mode, each remote antenna 106a-n is preferably measured separately. The distributed antenna system 100 may then report the results to the base station 104, to a server coupled to the distributed antenna system 100 or to some other location via the cellular telecommunication network to which the base station 104 is connected. A determination of which transmission frequency (including downlink and uplink pair) is be used by the distributed antenna system 100 while in normal mode may be determined automatically based on the reported results. This automatic determination may be performed by the base station 104 or by a server coupled to the distributed antenna system 100. Alternatively, a human operator may review the results and determine which transmission frequency is to be used by the distributed antenna system 100 when in normal mode. In still another embodiment, the transmission frequency may be determined by the controller 118. In this case, the distributed antenna system 100 may not report the results, but may simply adopt the self-determined transmission frequency.

Results determined during listening mode may be reported in the form of a table. For example, the controller 118 may generate and report the table. Table 1 below shows an exemplary table which may be reported during listening mode. Table 1 shows measured field strengths related to each antenna 106a-n. Particularly, Table 1 includes a row for each antenna 108a-n. Included in the row for a particular antenna is the measured field strength measurements for each frequency (or frequencies) for which the measurements are taken. As shown in Table 1, the frequencies at which the field strength measurements are taken for each antenna unit are given as $F_1, F_2, F_3, \ldots F_N$ while the corresponding field strength measurements are given as $A_1, A_2, A_3, \ldots A_N$. If no signal is detected by a particular antenna for a particular frequency, this information is also recorded in the table, e.g. as no entry or Ø. It will be apparent that Table 1 is exemplary and that the results may be arranged differently.

| Antenna Unit | Field Strength(s) $F_1, F_2, F_3, \ldots F_N$ |
| --- | --- |
| 108a | $A_1, A_2, A_3, \ldots A_N$ |
| 108b | $A_1, A_2, A_3, \ldots A_N$ |
| . | . |
| . | . |
| . | . |
| 108n | $A_1, A_2, A_3, \ldots A_N$ |

As mentioned, the transmission frequency selected for use by the distributed antenna system 100 during normal mode is preferably one that is not being used by any of the overlapping cells of the cellular network 200 (FIGS. 2 and 3). However, in an embodiment, the frequency selected for use by the distributed antenna system 100 may be one that is being used by an overlapping cell. For example, during listening mode, it may be discovered that a particular frequency is being used by a nearby cell, but that the signal is only received weakly by a limited number of the antennas 106a-n. In this case, it can be expected that if the antennas 106a-n are located indoors, any interference will be minimal. To further reduce the potential for interference in such a situation, the distributed antenna system 100 may be configured so that a particular one or more of the antennas 106a-n transmits at a lower power. These particular antennas 106a-n are selected to be those whose coverage area overlaps the coverage area of a cell of the network 200. This may be accomplished by the controller 118 causing the transceivers 116a-n corresponding to the particular antennas to transmit at the lower power.

In accordance with an embodiment of the invention, the distributed antenna system 100 switches from normal mode to listening mode in response to an information message. For example, the base station 104 may send a message to the controller 118 of the distributed antenna system 100 instructing the distributed antenna system 100 to switch from normal mode to listening mode. Alternatively, rather than receiving the message from the base station 104, a server may be connected to the controller 118 through an Ethernet connection; in this case, an operator or software at the server may send the message. Such a message may also identify a frequency band in which the distributed antenna system 100 is to listen and possibly the channels within the band. In response to the message, the controller 118 may instruct the transceivers 116a-n to tune to frequencies in the specified frequency band.

Once the appropriate information is gathered in listening mode, the distributed antenna system 100 may receive a second message instructing the distributed antenna system 100 to switch back to normal mode. This second message may also include information which is used to configure the distributed antenna system 100 for normal mode. This information may include the identification of a frequency pair to be used by the distributed antenna system 100 for the downlink and uplink signaling with the mobile devices 108a-n (FIG. 1).

Rather than entering the listening mode in response to a message, the distributed antenna system 100 may the enter listening mode upon being powered on. Then, once the appropriate information is gathered in listening mode, the distributed antenna system 100 may switch back to normal mode.

In an embodiment, the distributed antenna system 100 may default to the listening mode unless it detects a communication signal from its connected base station 104. More particularly, when the distributed antenna system 100 does not detect any communications signal from the base station 104, it may default to the listening mode. Then, in response to the distributed antenna system 100 detecting a communications signal from the base station 104, the distributed antenna system 100 switches to the normal mode. During the listening mode, taking of the field strength measurements may be performed under control of the base station 104. In this embodiment, the field strength meter 120 may be included in the base station 104 rather than in the hub 102. In addition, during listening mode, rather than measuring the signal received by each antenna separately, the base station 104 may take its field strength measurements from the combined signal received from all of the antennas 106a-n. The base station 104 may then inform the distributed antenna system 100 of the frequency pair to be used by the distributed antenna system 100 for normal mode before the base station 104 commences transmitting in normal mode.

Figure 7:
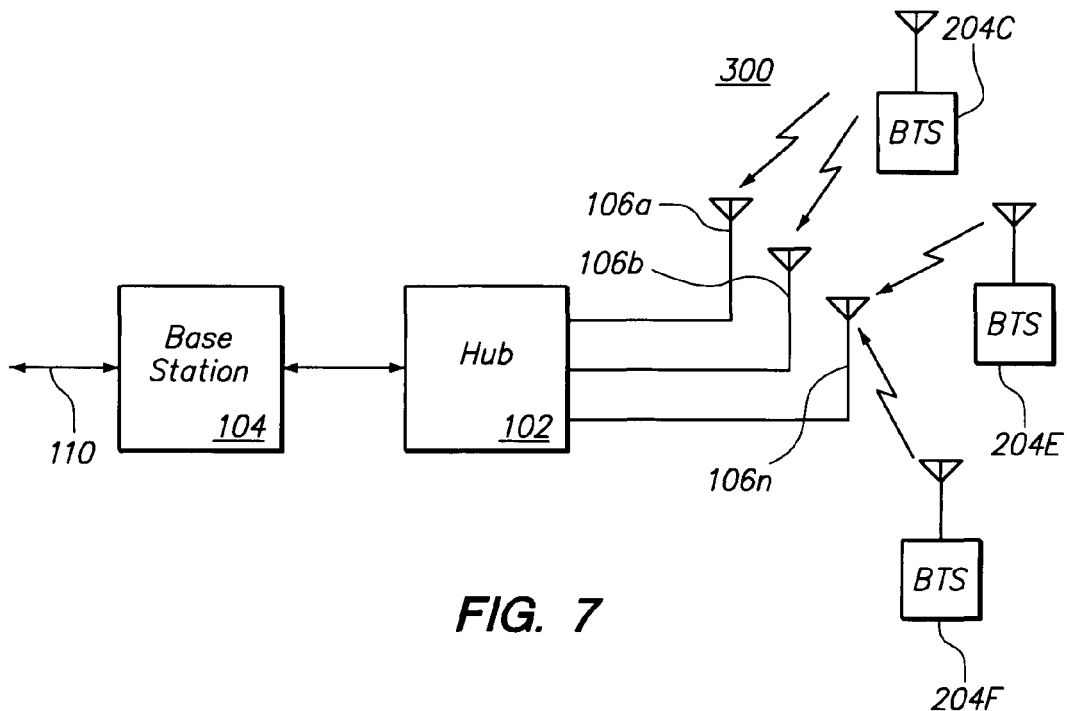
FIG. 7 illustrates a distributed antenna communications system and base station having signal metering capability in accordance with an embodiment of the present invention.

As mentioned, the base station 104 may include signal metering capability. In this case, the base station 104 may perform the field strength measurements. FIG. 7 illustrates a distributed antenna communications system 300 and a base station 104 having signal metering capabilities. The base station 104 is coupled to the hub 102, which is, in turn, coupled to multiple antennas 106a-n. As before, the system 300 operates in a normal mode, in which the antennas 106a-n perform bi-directional communications with mobile units and, in a listening mode, in which the system 300 determines whether there is any overlap with cells of the network 200 (FIGS. 2 and 3). In the listening mode, the base station 104 is configured to listen to the downlink frequencies of the neighboring base stations 108a-n. Because the signals from each of the distributed antennas 106a-n are combined by the hub 102, the base station 104 may measure the field strength of the combined signal. The base station 104 may then perform signal field strength measurements and instruct the hub 102 to configure its transceivers 116a-n to operate in an appropriate downlink frequency. Alternatively, the base station 104 may send the results to a server or to a human operator via the connected cellular telecommunication network, as described above in connection with FIG. 4.

The embodiment of FIG. 7 preferably enters and exits listening mode without requiring signaling between the hub 102 and base station 104. As described above, the hub 102 may default to the listening mode unless it detects a communication signal from its connected base station 104. Then, in response to the hub 102 detecting a communications signal from the base station 104, it may switch to the normal mode.

Figure 8A:
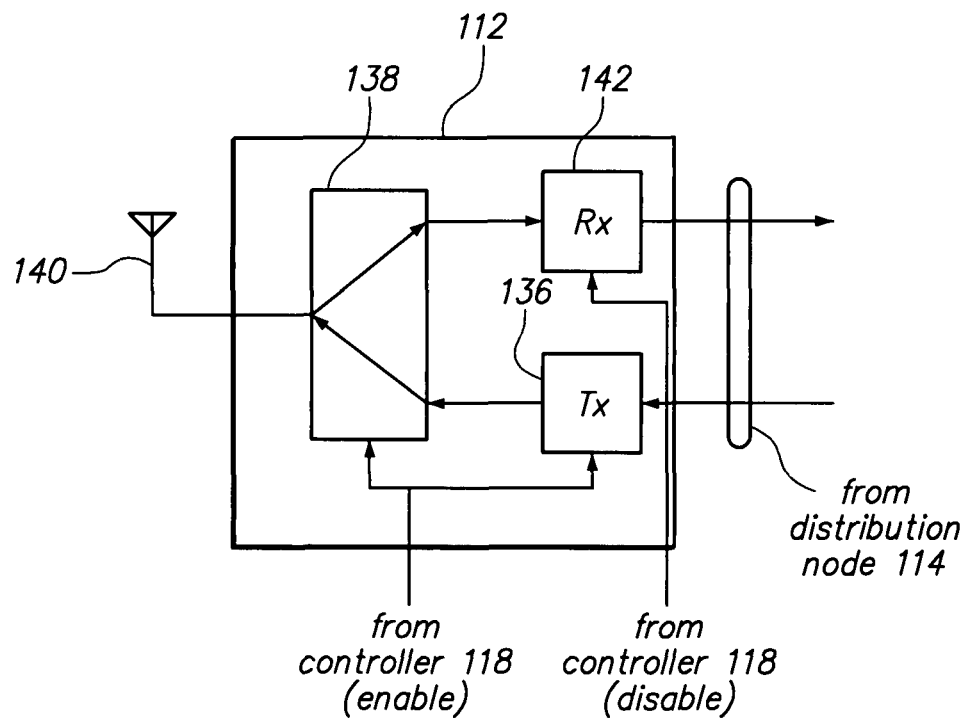
FIGS. 8A-B illustrate a transceiver for interfacing with a base station having signal metering capability in accordance with embodiments of the present invention.

In the embodiment of FIG. 7, for listening mode, the hub 102 is reconfigured to transmit frequencies assigned to the downlink to the base station 104 (FIGS. 1 and 4) so that the base station 104 can perform the field strength measurements. To accomplish this, the transceiver 112 of the hub 102 may include a tunable transmit signal path which can be tuned to the downlink frequencies during listening mode. FIG. 8A illustrates a transceiver 112 having a tunable transmit signal path in accordance with an embodiment of the present invention. As shown in FIG. 8A, the transceiver 112 includes a tunable transmitter 136 and a tunable duplexer 138. The duplexer 138 is coupled to an antenna 140 which is used to communicate with the base station 140. Signals received from the distributed antennas 116a-n are passed through other elements of the hub 102 (e.g. the distribution node 114) and then to the transmitter 136. The transmitter 136 may perform such functions as signal filtering and frequency up-conversion. The signal from the transmitter 136 is then forwarded to the base station 104 via the duplexer 138 and antenna 140. As shown in FIG. 8A, the transmit signal path, including the transmitter 136 and duplexer 138 are tunable under control of the controller 118 depending upon whether the system is in listening mode or normal mode. In addition, a receiver 142 which is used for the downlink during normal mode, may be disabled by the controller 118 during listening mode. In normal mode, the receiver 142 may perform such functions as signal filtering and frequency down-conversion.

Figure 8B:
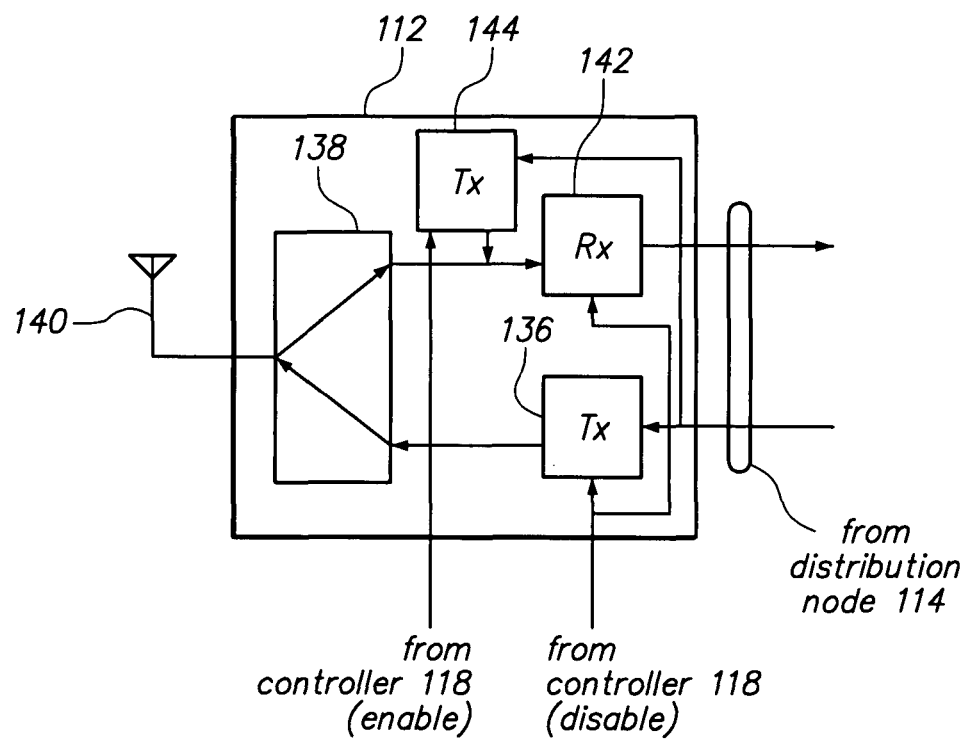

In an alternative embodiment, rather than the transceiver 112 including a tunable transmit signal path as in FIG. 8A, the transceiver 112 may include an alternative signal path for listening mode. FIG. 8B illustrates a transceiver 112 having an alternative transmit signal path in accordance with an embodiment of the present invention. As shown in FIG. 8B, the transceiver 112 includes a duplexer 138, a transmitter 136 and a receiver 142. During normal mode, the transmitter 136 sends uplink signals to the base station 104 via the duplexer 138 and antenna 140 while the receiver 142 receives downlink signals from the base station 104 via the antenna 140 and the duplexer 138. The transceiver 136 is configured to transmit signals within the frequency range assigned to the uplink. In addition, the transceiver 112 includes an alternative signal path through a second transmitter 144. The second transmitter 144 is configured to transmit signals within the frequency range assigned to the downlink.

The second transmitter 144 may be coupled to the receive side of the duplexer 138 for transmitting signals via the duplexer 138 during listening mode. This is because the duplexer 138 is configured such that its receive side will pass the range of frequencies assigned to the downlink. During listening mode, the signals to be transmitted to the base station 104 are also within the downlink frequencies. The input of the transmitter 144 is coupled to the transmit signal path at the input of the transmitter 136. To reconfigure the transceiver 112 of FIG. 8B for listening mode, the controller 118 disables the transmit signal path by disabling the transmitter 136 and enables the alternative transmit signal path by enabling the transmitter 144. To return to normal mode, the transmit signal path is enabled by enabling the transmitter 136, while the alternative transmit signal path is disabled by disabling the transmitter 144.

Rather than the second transmitter 144 being coupled to the receive side of the duplexer 138 as shown in FIG. 8B, the second transmitter 144 may be coupled to the antenna 140. In this embodiment, the alternative transmit signal path bypasses the duplexer 138. Also, in this embodiment, the second transmitter 144 may include a filter between the antenna 140 and its transmit circuitry.

Additionally, rather than employing the duplexer 138 as in FIGS. 8A and 8B for bi-directional communication between the hub 102 and base station 104, the transceiver 112 may be coupled to the base station via two separate signal paths (e.g., separate cables) each carrying signals in one direction only. In this case, the tunable transceiver 136 of FIG. 8A may be coupled to either one of the separate signal paths between the hub 102 and the base station 104. Similarly, the alternative transmit signal path of FIG. 8B may be coupled to either one of the separate signal paths between the hub 102 and the base station 104.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A distributed antenna system comprising:
    a plurality of antennas; and
    a multi-port hub comprising an interface to a telecommunications network and a plurality of transceivers, wherein the multi-port hub is configured to operate in a first mode in which the multi-port hub receives a downlink communications signal via the interface and distributes the downlink communications signal to the plurality of antennas using a selected downlink transmission frequency within a downlink frequency range and in which the multi-port hub receives uplink communications signals from the plurality of antennas at a selected uplink receive frequency and wherein the multi-port hub is configured to operate in a second mode in which the multi-port hub receives communications signals from the plurality of antennas at one or more frequencies within the downlink frequency range.

2. The distributed antenna system according to claim 1, wherein each transceiver is configurable to transmit at a selected transmission frequency and wherein the transmission frequency for the first mode is selected based on measured field strength of the signals received in the second mode.

3. The distributed antenna system according to claim 1, wherein the multi-port hub enters the second mode in response to detecting the absence of a signal from the interface.

4. The distributed antenna system according to claim 3, wherein the multi-port hub enters the first mode in response to the signal being detected at the interface.

5. The distributed antenna system according to claim 1, further comprising a meter for measuring field strength of signals received by the antennas.

6. The distributed antenna system according to claim 5, the meter being located in a base station coupled to the distributed antenna system via the interface.

7. The distributed antenna system according to claim 1, wherein one or more of the transceivers further comprises a tunable receive signal path for receiving the uplink communications signals in the first mode and for receiving the communications signals at one or more frequencies within the downlink frequency range in the second mode.

8. The distributed antenna system according to claim 1, wherein one or more of the transceivers further comprises first and second receive signal paths, the first path for receiving the uplink communications signals in the first mode and the second path for receiving the communications signals at one or more frequencies within the downlink frequency range in the second mode.

9. The distributed antenna system according to claim 1, wherein the interface further comprises a tunable transmit signal path for transmitting the uplink communications signals to the telecommunications network in the first mode and for transmitting the communications signals at one or more frequencies within the downlink frequency range to the telecommunications network in the second mode.

10. The distributed antenna system according to claim 1, wherein the interface further comprises first and second transmit signal paths, the first path for transmitting the uplink communications signals to the telecommunications network in the first mode and the second path for transmitting the communications signals at one or more frequencies within the downlink frequency range to the telecommunications network in the second mode.

11. A distributed antenna system comprising:
a plurality of antennas;
a meter for measuring field strength of signals received by the antennas; and
a multi-port hub comprising an interface to a telecommunications network and a plurality of transceivers, each transceiver being configurable to transmit at a selected transmission frequency, wherein the multi-port hub is configured to operate in a first mode in which the multi-port hub receives a downlink communications signal via the interface and distributes the downlink communications signal to the plurality of antennas using a selected downlink transmission frequency and in which the multi-port hub receives uplink communications signals from the plurality of antennas at a selected uplink receive frequency and wherein the multi-port hub is configured to operate in a second mode in which the multi-port hub receives communications signals from the plurality of antennas and the meter measures the field strength of each of the signals at a plurality of frequencies, wherein the transmission frequency and the receive frequency for the first mode are selected based on the measured field strength of the signals received in the second mode.

12. The distributed antenna system according to claim 11, wherein in the first mode, the distributed antenna system receives uplink communications signals from one or more mobile units.

13. The distributed antenna system according to claim 12, wherein in the second mode, the distributed antenna system receives downlink communications from one or more nearby base transceiver stations of a cellular network.

14. The distributed antenna system according to claim 11, wherein the multi-port hub enters the second mode in response to receiving a message.

15. The distributed antenna system according to claim 11, wherein the multi-port hub enters the second mode in response to detecting the absence of a signal from the interface.

16. The distributed antenna system according to claim 15, wherein the multi-port hub enters the first mode in response to the signal being detected at the interface.

17. The distributed antenna system according to claim 15, further comprising a base transceiver station coupled to the multi-port hub via the interface wherein the base transceiver station includes the meter.

18. The distributed antenna system according to claim 11, wherein the transmission and receive frequencies used in the second mode are selected to avoid using any frequency detected during the first mode.

19. The distributed antenna system according to claim 11, wherein the transmission frequency used in the second mode is the same as a frequency detected at one or more of the antennas during the first mode and wherein the transmit power for those antennas is adjusted lower than the remaining antennas.

20. The distributed antenna system according to claim 11, wherein the distributed antenna system measures multiple different frequency bands in the first mode, each frequency band comprising a plurality of channel frequencies for which field strength measurements are taken.

21. The distributed antenna system according to claim 11, wherein the transceivers are reconfigurable to operate in the first and second modes by comprising a frequency tunable receive signal path.

22. The distributed antenna system according to claim 11, wherein the transceivers are reconfigurable to operate in the first and second modes by comprising a receive signal path for operation in the second mode and an alternative receive signal path for operation in the first mode.

23. The distributed antenna system according to claim 11, wherein the transceivers are tuned to each of the plurality of frequencies in the first mode.

24. The distributed antenna system according to claim 11, wherein the transceivers are tuned to a frequency band including each of the plurality of frequencies and wherein a tunable filter is coupled to the meter and selectively tuned to each of the plurality of frequencies in the first mode.

25. The distributed antenna system according to claim 11, wherein one or more of the transceivers further comprises a tunable receive signal path for receiving the uplink communications signals in the first mode and for receiving the communications signals at one or more frequencies within the downlink frequency range in the second mode.

26. The distributed antenna system according to claim 11, wherein one or more of the transceivers further comprises first and second receive signal paths, the first path for receiving the uplink communications signals in the first mode and the second path for receiving the communications signals at one or more frequencies within the downlink frequency range in the second mode.

27. The distributed antenna system according to claim 11, wherein the interface further comprises a tunable transmit signal path for transmitting the uplink communications signals to the telecommunications network in the first mode and for transmitting the communications signals at one or more frequencies within the downlink frequency range to the telecommunications network in the second mode.

28. The distributed antenna system according to claim 11, wherein the interface further comprises first and second transmit signal paths, the first path for transmitting the uplink communications signals to the telecommunications network in the first mode and the second path for transmitting the communications signals at one or more frequencies within the downlink frequency range to the telecommunications network in the second mode.

* * * * *